(12) United States Patent
Cooper

(10) Patent No.: US 8,702,046 B2
(45) Date of Patent: Apr. 22, 2014

(54) MOUNTING DEVICE

(75) Inventor: Jeramie Cooper, Stevens Point, WI (US)

(73) Assignee: L&P Property Management Company, South Gate, CA (US)

( * ) Notice: Subject to any disclaimer, the term of this patent is extended or adjusted under 35 U.S.C. 154(b) by 308 days.

(21) Appl. No.: 12/843,109

(22) Filed: Jul. 26, 2010

(65) Prior Publication Data

US 2012/0018475 A1 Jan. 26, 2012

(51) Int. Cl.
*A47F 5/00* (2006.01)
*F16M 13/00* (2006.01)
*F16M 11/00* (2006.01)
*A47B 11/00* (2006.01)

(52) U.S. Cl.
USPC ........ 248/125.8; 248/423; 248/408; 248/411; 248/413; 248/414; 108/141

(58) Field of Classification Search
USPC ............ 108/44, 141, 140, 147.19; 248/125.8, 248/161, 423, 408, 411, 413, 414, 178.1, 248/354.3, 354.4
See application file for complete search history.

(56) References Cited

U.S. PATENT DOCUMENTS

| | | | | |
|---|---|---|---|---|
| 701,238 A | * | 5/1902 | Williams | 292/61 |
| 1,346,586 A | | 7/1920 | Barber | |
| 1,491,685 A | * | 4/1924 | Eicher et al. | 248/408 |
| 1,518,227 A | * | 12/1924 | Simonson | 248/162.1 |
| 1,610,069 A | * | 12/1926 | Weber | 248/623 |
| 1,787,251 A | * | 12/1930 | Jancke et al. | 34/99 |
| 1,888,478 A | * | 11/1932 | Steidl | 108/136 |
| 2,113,753 A | * | 4/1938 | Wilson | 49/395 |
| 2,120,310 A | | 6/1938 | Duncan | |
| 2,154,294 A | * | 4/1939 | Whedon | 248/395 |
| 2,219,456 A | * | 10/1940 | Saunders et al. | 248/419 |
| 2,235,904 A | * | 3/1941 | Schulz | 248/430 |

(Continued)

FOREIGN PATENT DOCUMENTS

| | | |
|---|---|---|
| EP | 0426628 | 5/1991 |
| GB | 2178950 | 2/1987 |

OTHER PUBLICATIONS

D&R Electronics Co Ltd, "The Ultimate in Car Console for any Laptop Computer System," advertisement (2001) 1 page.
Gamber-Johnson LLC, "Vertical Lift," drawing (2002) 3 pages.

(Continued)

*Primary Examiner* — Joshua J Michener
*Assistant Examiner* — Chiedu Chibogu
(74) *Attorney, Agent, or Firm* — Michael Best & Friedrich LLP

(57) ABSTRACT

A telescoping mount includes an outer member, an inner member at least partially received in the outer member such that one member is movable relative to the other member between an extended position and a retracted position, a platform coupled to one of the outer and inner members for supporting a device, and a locking mechanism. The locking mechanism is operable to substantially lock the position of the outer and inner members relative to one another in a plurality of non-predefined positions between the extended position and the retracted position. The locking mechanism is movable manually by a user to an unlocked position allowing adjustment of the mount between the extended and retracted positions, and the locking mechanism is movable automatically, upon release of the locking mechanism by the user, to a locked position in which the outer and inner members are substantially prevented from moving relative to one another.

22 Claims, 6 Drawing Sheets

(56) References Cited

U.S. PATENT DOCUMENTS

| | | | |
|---|---|---|---|
| 2,357,608 A * | 9/1944 | Ostrowski | 292/60 |
| 2,530,877 A * | 11/1950 | Heck et al. | 160/24 |
| 2,628,142 A | 2/1953 | Dubach | |
| 2,659,413 A * | 11/1953 | Cramer | 297/423.38 |
| 2,751,794 A * | 6/1956 | Sandberg et al. | 74/503 |
| 2,893,470 A | 7/1959 | Peller | |
| 3,100,618 A * | 8/1963 | Tengler et al. | 248/430 |
| 3,397,000 A * | 8/1968 | Nakanishi | 292/61 |
| 3,554,585 A * | 1/1971 | Sorenson | 403/105 |
| 3,604,734 A * | 9/1971 | Friedman et al. | 403/104 |
| 3,641,598 A * | 2/1972 | Feldstein | 5/100 |
| 3,648,956 A * | 3/1972 | Paulson et al. | 248/654 |
| 3,708,203 A * | 1/1973 | Barecki et al. | 297/344.13 |
| 3,758,063 A | 9/1973 | Lacey | |
| 3,785,079 A * | 1/1974 | Rohn | 43/4 |
| 3,845,926 A | 11/1974 | Wahls | |
| 4,113,221 A * | 9/1978 | Wehner | 248/408 |
| 4,140,415 A * | 2/1979 | Koyamato | 403/104 |
| 4,165,854 A * | 8/1979 | Duly | 248/408 |
| 4,243,342 A * | 1/1981 | Marto | 403/324 |
| 4,317,387 A * | 3/1982 | Myers et al. | 74/493 |
| 4,408,743 A * | 10/1983 | DeWitt et al. | 248/285.1 |
| 4,562,706 A * | 1/1986 | Pickett et al. | 70/1.5 |
| 4,657,218 A * | 4/1987 | Scheberle et al. | 248/411 |
| 4,659,105 A * | 4/1987 | Ziaylek, Jr. | 280/748 |
| 4,690,362 A | 9/1987 | Helgeland | |
| 4,733,838 A | 3/1988 | van der Lely | |
| 4,884,842 A * | 12/1989 | Finkelstein | 297/331 |
| 5,344,175 A * | 9/1994 | Speer | 280/506 |
| 5,433,552 A * | 7/1995 | Thyu | 403/378 |
| 5,615,620 A * | 4/1997 | Owen | 108/45 |
| 5,751,548 A | 5/1998 | Hall et al. | |
| 6,213,438 B1 | 4/2001 | Ostby et al. | |
| 6,299,223 B1 * | 10/2001 | Ji et al. | 292/175 |
| 6,581,528 B2 * | 6/2003 | Tseng | 108/147.19 |
| 6,712,321 B1 | 3/2004 | Su et al. | |
| 6,908,249 B2 | 6/2005 | Tomm | |
| 7,025,522 B2 * | 4/2006 | Sicz et al. | 403/109.2 |
| 7,198,306 B2 * | 4/2007 | Ambs | 292/175 |
| 7,204,466 B2 | 4/2007 | Hsieh | |
| 7,392,965 B2 | 7/2008 | Jung | |
| 7,474,522 B2 | 1/2009 | Bliven | |
| 7,594,633 B2 | 9/2009 | Carnevali | |
| 7,611,103 B2 | 11/2009 | Ha et al. | |
| 7,694,920 B2 | 4/2010 | Lien et al. | |
| 7,712,710 B2 * | 5/2010 | Root | 248/125.8 |
| 8,121,666 B2 * | 2/2012 | Otsuka et al. | 600/407 |
| 2004/0060486 A1 * | 4/2004 | Franze et al. | 108/147.19 |
| 2006/0186284 A1 | 8/2006 | Root | |
| 2008/0116333 A1 * | 5/2008 | Chang | 248/200.1 |
| 2009/0087251 A1 | 4/2009 | Chen | |
| 2010/0084534 A1 | 4/2010 | Greenwood | |

OTHER PUBLICATIONS

D&R Electronics Co, "LT5200 Laptop Mount," drawing (2005) 1 page.
D&R Electronics Co, "LT5200 Laptop Mount," figure (admitted as prior art available at least as early as Jul. 25, 2009) 1 page.
Gamber-Johnson LLC, "DS-Lift," brochure (admitted as prior art available at least as early as Jul. 25, 2009) 1 page.
Precision, "Mounting Technologies 45 Degree Slide," http://precisionmounts.com/laptop-mounts.html (admitted as prior art available at least as early as Jul. 25, 2009) 4 pages.
REO Mobile System, "Self Elevating Pedestal with Articulating Arm," figure (admitted as prior art available at least as early as Jul. 25, 2009) 1 page.

* cited by examiner

US 8,702,046 B2

MOUNTING DEVICE

BACKGROUND

The present invention relates to mounting devices, and more particularly to mounting devices for computers, radios, and other equipment.

Mounting devices are known for mounting computers, radios, and other equipment to a support structure. Such mounting devices are often designed for use in vehicles (e.g., police vehicles, ambulances, delivery vehicles, and the like).

SUMMARY

In one embodiment, the invention provides a telescoping mount including an outer member, an inner member at least partially received in the outer member such that one of the outer member and the inner member is movable relative to the other of the outer member and the inner member between an extended position and a retracted position, a mounting platform coupled to one of the outer and inner members for supporting a device, and a locking mechanism. The locking mechanism is operable to substantially lock the position of the outer and inner members relative to one another in a plurality of non-predefined positions between the extended position and the retracted position. The locking mechanism is movable manually by a user to an unlocked position allowing adjustment of the mount between the extended and retracted positions, and the locking mechanism is movable automatically, upon release of the locking mechanism by the user, to a locked position in which the outer and inner members are substantially prevented from moving relative to one another.

In one aspect of the invention, the locking mechanism includes an extension member coupled to the outer member and an axle at least partially supported by the extension member. The axle is rotatable about an axis of rotation that extends transverse to a direction of movement of the inner and outer members between the extended and retracted positions. Rotation of the axle in a first, unlocking direction of rotation causes translation of the axle along the axis in a direction away from the inner member to move the locking mechanism to an unlocked position, allowing adjustment of the mount between the extended and refracted positions. Rotation of the axle in a second, locking direction of rotation causes translation of the axle along the axis in a direction toward the inner member to move the locking mechanism to a locked position in which the outer and inner members are substantially prevented from moving relative to one another. The locking mechanism further includes a cover member coupled to the axle for rotation therewith. The cover member at least partially surrounds the axle. A biasing element is coupled between the extension member and the cover member to bias the axle rotationally in the second, locking direction. A handle is fixed to the axle for rotation therewith such that turning of the handle by the user in the first, unlocking direction of rotation overcomes the bias of the biasing element and stores energy in the biasing element, and such that release of the handle by the user results in the stored energy in the biasing element automatically rotating the axle in the second, locking direction.

Other aspects of the invention will become apparent by consideration of the detailed description and accompanying drawings.

DETAILED DESCRIPTION

Figure 1:
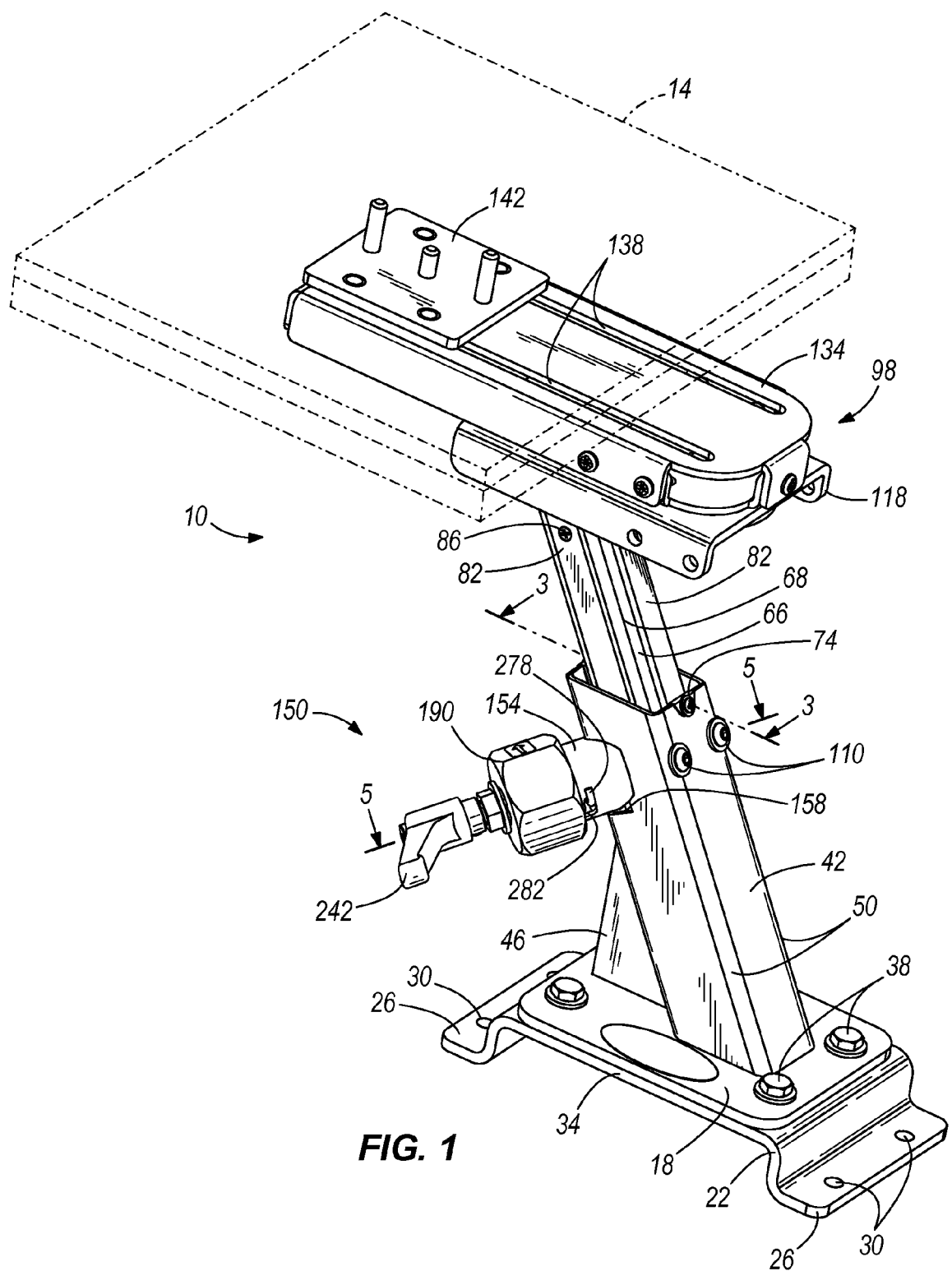
FIG. 1 is a perspective view of a mounting device embodying the invention shown in a fully extended position.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1-4 illustrate a mounting device in the form of a telescoping mount 10. The mounting device 10 can be used for mounting computers, radios, and other equipment to a support structure. The illustrated mounting device 10 can be installed in a vehicle (e.g., police vehicles, ambulances, delivery vehicles, and the like) to support a device 14, such as a laptop or notebook computer.

The illustrated mounting device 10 includes a base 18 configured to be mounted to a support structure such as a floor of a vehicle. The base 18 can be directly secured to the support structure, or can be mounted to an optional mounting bracket 22 that can in turn be directly secured to the support structure. The illustrated mounting bracket 22 includes flanges 26 having mounting apertures 30 for receiving fasteners to secure the bracket 22 to the support structure. The bracket further includes a body portion 34 offset from the flanges 26. The bracket 22 can be designed with different offsets between the body portion 34 and the flanges 26 to accommodate different height requirements in different vehicles. The base 18 is secured to the bracket 22 by fasteners 38.

In one embodiment, an outer member 42 is coupled (e.g., by welding, brazing, or other suitable securing methods) to the base 18 and extends upwardly therefrom. As shown in the illustrated embodiment, the outer member 42 extends from the base 18 at a non-perpendicular angle. A support member or rib 46 is coupled (e.g., by welding, brazing, or other suitable securing methods) between the outer member 42 and the base 18 to support and strengthen the outer member 42 as it extends away from the base 18. In other embodiments, the outer member 42 could extend at other angles, or in a substantially perpendicular manner, from the base 18.

The illustrated outer member 42 takes the form of a tubular member having a generally rectangular cross-sectional shape. As shown, the outer member 42 has a substantially square cross-sectional shape with the corners 50 being slightly rounded or radiused. The outer member 42 can be made of suitable metals (e.g., steel or aluminum) or plastics. As best shown in FIG. 3, the interior of the outer member 42 and the base 18 together define a chamber 54. The base 18 includes one or more drain holes 58 (see also FIGS. 2 and 4) to allow liquid to exit the chamber 54. The body portion 34 of the optional bracket 22 also includes an aperture 62 that allows liquid to exit the drain holes 58.

Figure 2:
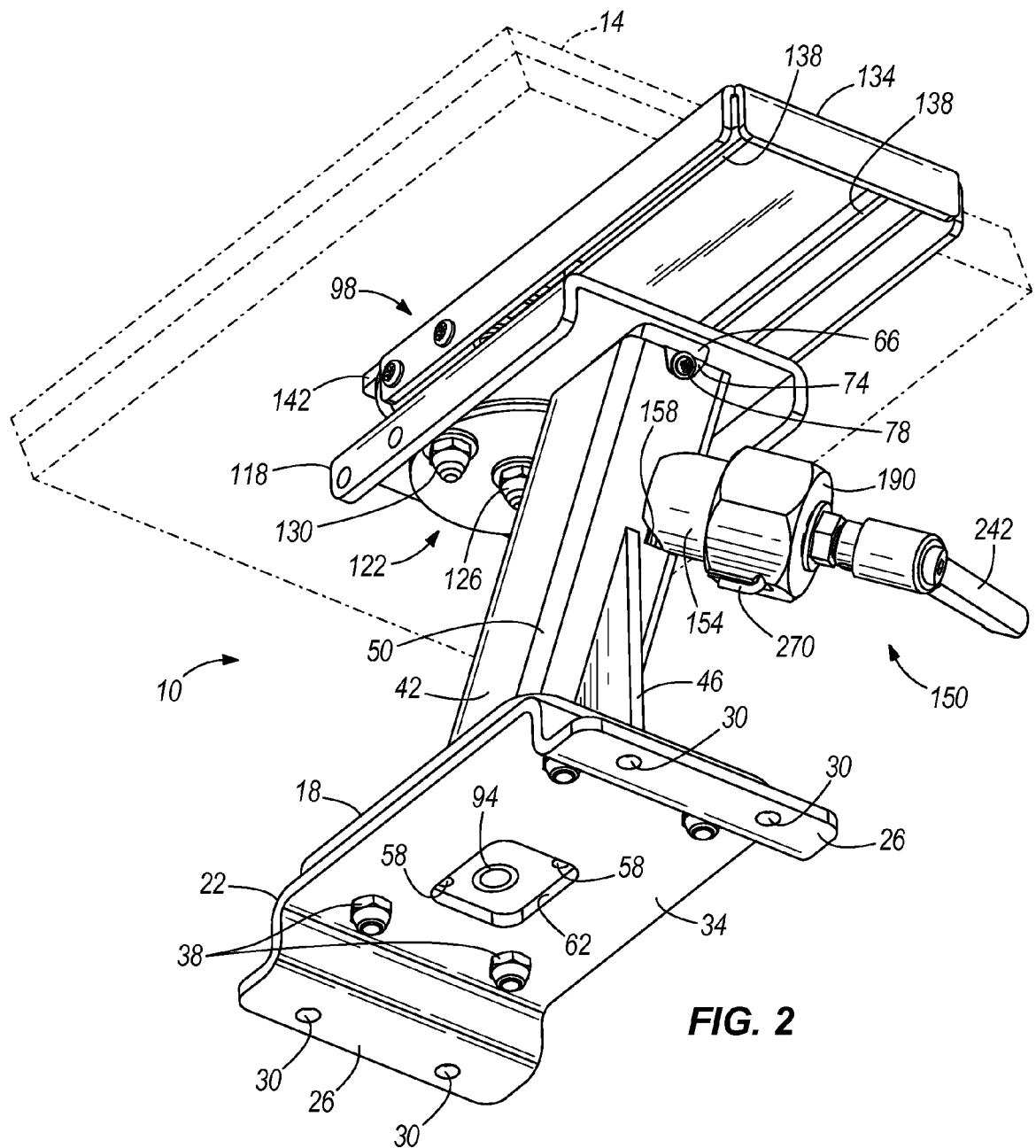
FIG. 2 is a perspective view of the mounting device of FIG. 1 shown in a fully retracted position.
Figure 3:
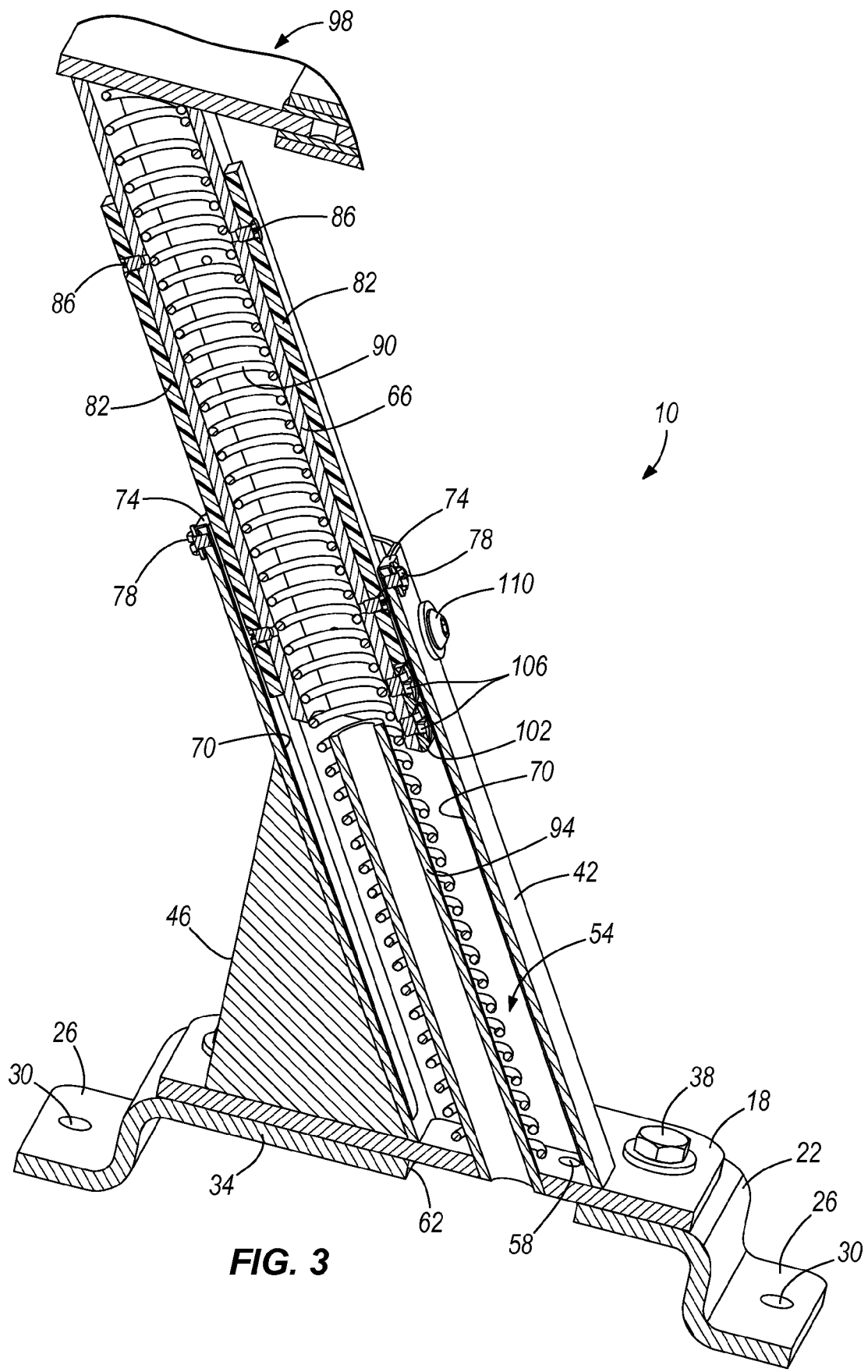
FIG. 3 is a partial section view taken along line 3-3 of FIG. 1.

The mounting device 10 further includes an inner member 66 at least partially received in the outer member 42 for movement between an extended position (see FIGS. 1 and 3 showing the fully extended position) and a retracted position (see FIG. 2 showing the fully retracted position) relative to the outer member 42. This telescoping relationship between the outer member 42 and the inner member 66 provides height adjustability to the mounting device 10, and in the illustrated embodiment, provides adjustability ranging from about three to about five inches of actual vertical travel. It should be understood that the arrangement of the outer and inner members 42, 66 can be reversed from the illustrated embodiment, such that the inner member 66 is secured to the base 18 with the outer member 42 received over the inner member 66 for movement toward and away from the base 18. In other words, the outer member 42 and inner member 66 can be coupled together such that one of the outer member 42 and the inner member 66 is movable relative to the other of the outer member 42 and the inner member 66 between the extended position and the retracted position.

The illustrated inner member 66 takes the form of a tubular member having a generally rectangular cross-sectional shape. As shown, the inner member 66 has a substantially square cross-sectional shape with the corners 68 being slightly rounded or radiused. The inner member 66 can be made of suitable metals (e.g., steel or aluminum) or plastics. The use of the non-circular cross-sectional shapes for the outer and inner members 42, 66 eliminates the need for an anti-rotation device between the outer and inner members 42, 66. In alternative embodiments where relative rotation is desired between an inner and outer member, the members could have generally circular cross-sectional shapes.

The outer and inner members 42, 66 include features to reduce friction and improve the telescoping action between one another. As best seen in FIG. 3, the outer member 42 includes one or more metal (e.g., stainless steel) bearing plates 70 coupled to an inside surface thereof. The illustrated embodiment includes two plates 70 on oppositely facing inside surfaces (i.e., front and rear higher load-bearing surfaces). The plates 70 include formed-over ends 74 that help support the plates 70 over an upper edge of the outer member 42. Fasteners 78 can further secure the support plates 70 to the outer member 42, and adhesive can be used to help secure the plates 70 to the outer member 42 along their length.

The inner member 66 includes low-friction sliding members 82 coupled to outer surfaces thereof. In the illustrated embodiment, the sliding members 82 can be known low-friction plastics (e.g., Nylon, Teflon, Delrin, etc.) and are coupled by fasteners 86 to all four planar outer surfaces of the inner member 66. The two sliding members 82 in facing relationship with the bearing plates 70 cooperate with the bearing plates 70 to provide a smooth, low-friction telescoping action along the higher load-bearing interfacing surfaces that are in compression due to the angled relationship between the members 42, 66 and vertical. The two sliding members 82 on the lateral or side surfaces directly engage with the inner surface of the outer member 42 without an intervening bearing plate 70, although in other embodiments additional bearing plates 70 could be added. Those skilled in the art will understand that the locations of the bearing plates 70 and sliding member 82 could be reversed from that shown, and that other means of reducing friction and improving the telescoping action can be employed.

The illustrated mounting device 10 also includes a biasing member in the form of a compression spring 90 (see FIGS. 3, 5, and 6) coupled or positioned between the outer and inner members 42, 66. The compression spring 90 is supported in the chamber 54 on a spring guide 94 (see FIG. 3) coupled with the base 18. The illustrated spring guide 94 is a tubular rod that is secured (e.g., welded, brazed, press-fit, or otherwise secured) to the base 18 to extend upwardly from the base 18 in the chamber 54 at substantially the same angle as the outer member 42. The lower end of the compression spring 90 is therefore positioned over the spring guide 94 for support, with the lower end of the spring 90 abutting the base 18. The spring 90 extends upwardly into the interior of the inner member 66. A top end of the spring 90 abuts a mounting platform 98 coupled to the upper end of the inner member 66. The spring 90 is therefore generally co-axial with and centered within the outer and inner members 42, 66 to provide centered force application for a smooth telescoping action.

The spring 90 of the illustrated embodiment is selectively sized to resist movement of the inner member 66 toward the retracted position. In other words, the spring 90 is provided so that when the position of the inner member 66 relative to the outer member 42 is not locked (as will be discussed in greater detail below), the inner member 66 will not rapidly fall down to the fully retracted position shown in FIG. 2 due to the weight of the inner member 66, the mounting platform 98 and the device 14 supported by the mounting platform 98. Additionally, the illustrated embodiment is designed with the spring 90 selected so that when the position of the inner member 66 relative to the outer member 42 is not locked, the outer and inner members 42, 66 will not automatically move toward either of the extended position or the retracted position, but will remain substantially static or balanced until moved by a user. In other words, the spring 90 can be selected to provide a spring force that substantially balances the weights of the inner member 66, the mounting platform 98 and the device 14 supported by the mounting platform 98 to prevent automatic telescoping to one of the extended or retracted positions. A user can selectively lift or lower the mounting platform 98 as desired without fear that the platform 98 will want to automatically and rapidly fall down to the retracted position or rise up to the extended position. In other embodiments, the spring 90 need not provide a truly balanced system, but can be selected to allow for some slow and controlled movement toward either the extended position or the retracted position, while still being deemed to resist movement toward the refracted position, when the position of the inner member 66 relative to the outer member 42 is not locked.

Figure 5:
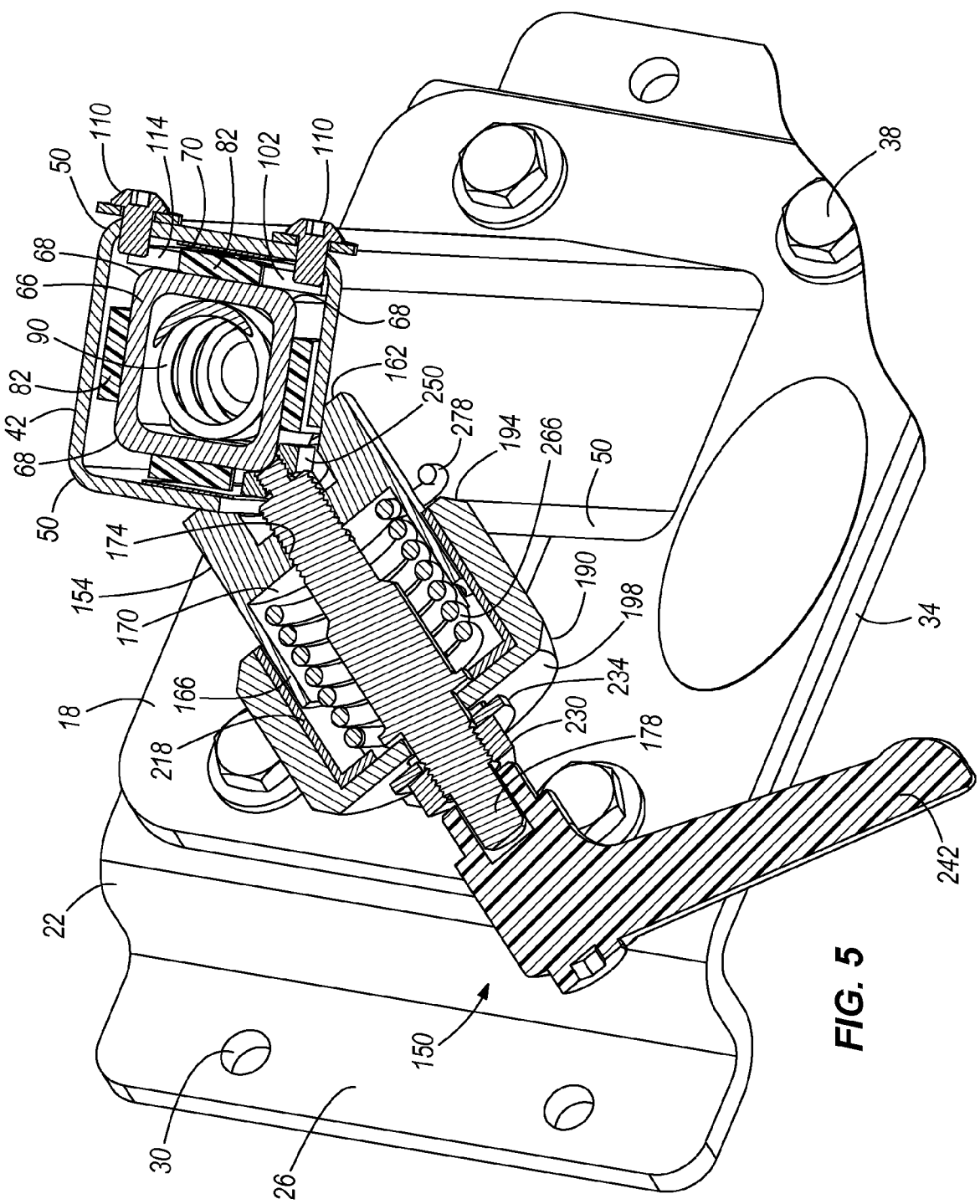
FIG. 5 is a section view taken along line 5-5 of FIG. 1 showing the locking device in its locked position.
Figure 6:
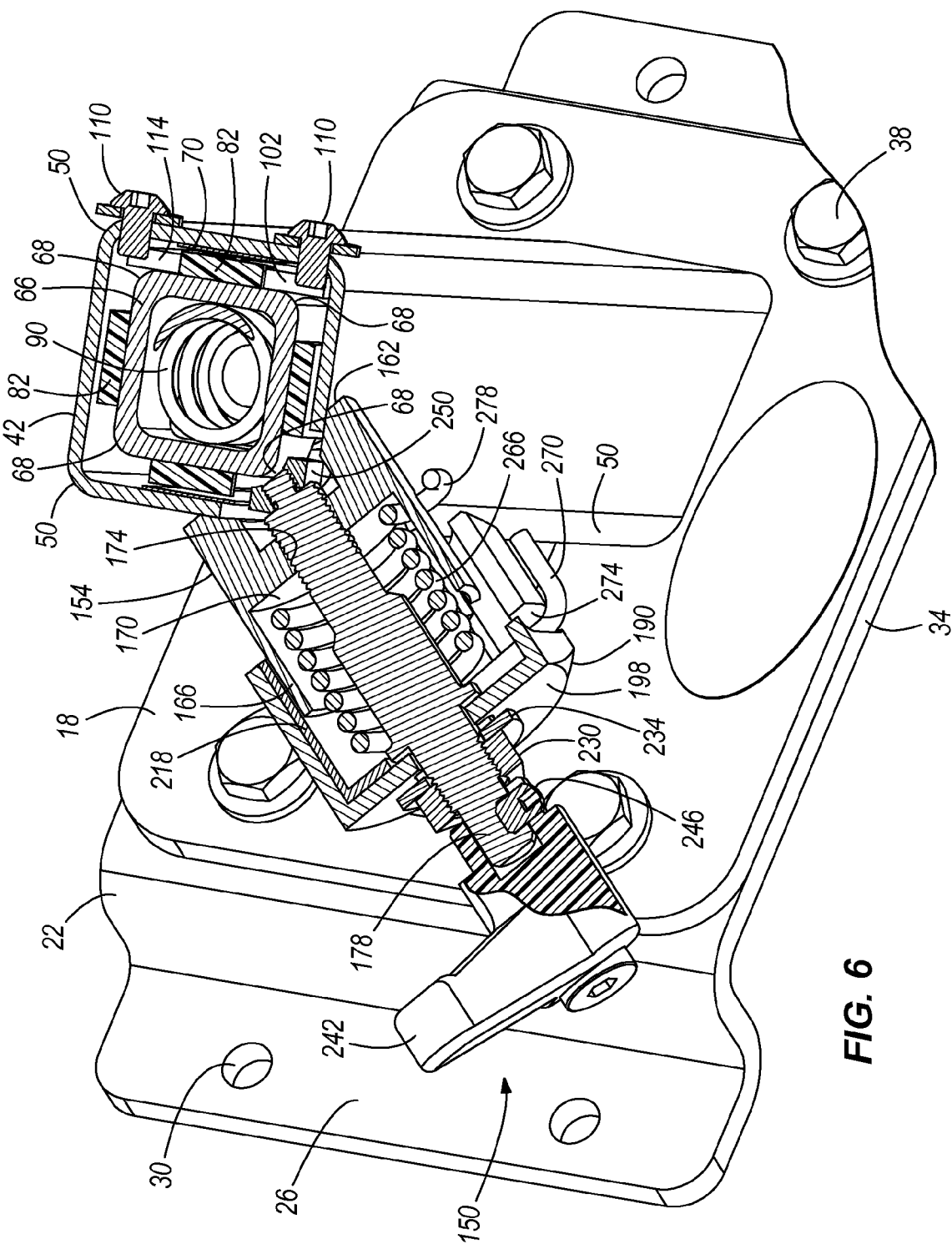
FIG. 6 is a section view similar to FIG. 5 showing the locking device in its unlocked position.

The mounting device 10 also includes a stop arrangement operable to prevent the inner member 66 from being removed from the outer member 42 during extension. As best seen in FIGS. 3, 5, and 6, a stop member 102 is secured to the outer rear planar surface at the lower end of the inner member 66. The stop member 102 can be any suitable material, and can be secured by fasteners 106 as shown, or by other suitable methods. Projections in the form of screws 110 extend through the rear wall of the outer member 42 such that they can engage an upper edge 114 (see FIGS. 5 and 6) of the stop member 102 to limit or prevent further upward travel of the inner member 66 relative to the outer member 42.

Figure 4:
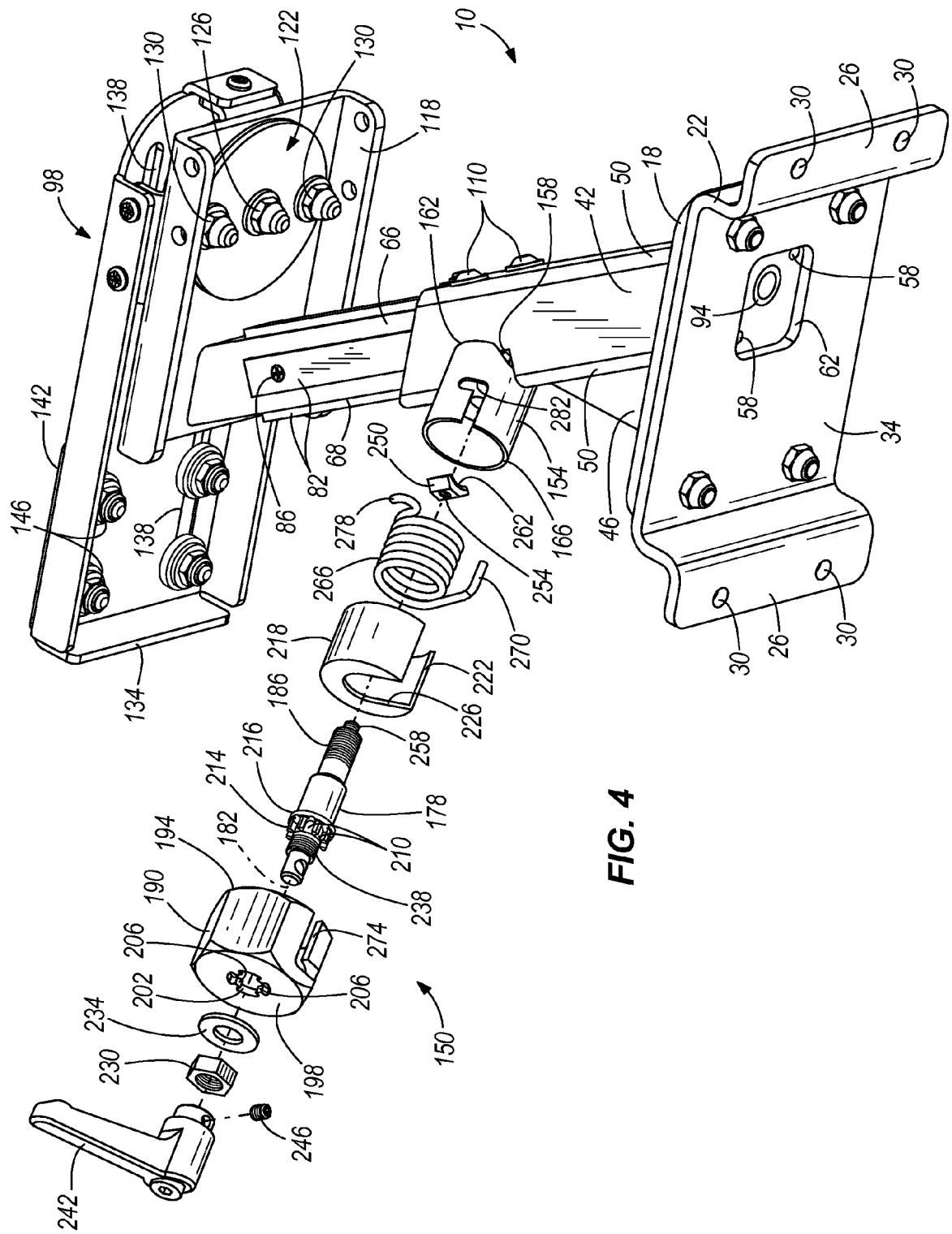
FIG. 4 is an exploded view of a locking mechanism of the mounting device of FIG. 1.

The mounting platform 98 can be a single piece platform, or as shown in the illustrated embodiment, can be made of several components coupled together to achieve the desired functionality and flexibility for the mounting device 10. Referring to FIGS. 1, 2, and 4, the illustrated mounting platform 98 includes a base 118 coupled (e.g., by welding, brazing, or other suitable securing methods) to the upper end of the inner member 66. A mount assembly 122 is coupled to the base 118 via a central fastener 126 that functions as an axis about which the mount assembly 122 can selectively rotate relative to the base 118. Lateral fasteners 130 spaced from the central fastener 126 can be loosened to allow the mount assembly 122 to be rotated relative to the base 118 about the central fastener 126. Once the desired rotational orientation is obtained, the lateral fasteners 130 can be tightened to secure the rotational position of the mount assembly 122 relative to the base 118.

The mount assembly 122 includes a slide base 134 having one or more slots 138 extending longitudinally, and a slide member 142 movably secured to the slide base 134 with fasteners 146 that pass through the slots 138. A user can adjust the position of the slide member 142, which supports the device 14, relative to the slide base 134 by loosening the fasteners 146, sliding the slide member 142 relative to the slide base 134 to the desired position, and then tightening the fasteners 146 to secure the slide member 142 relative to the slide base 134. In the illustrated embodiment, about five inches of horizontal adjustment is possible. Those skilled in the art will understand that the illustrated mounting platform 98 is just one possible arrangement that can be used with the mounting device 10, and that other mounting platform arrangements can be used depending on the device 14 being mounted and the functionality desired.

The mounting device 10 also includes a locking mechanism 150 operable to substantially lock the position of the outer and inner members 42, 66 relative to one another in a plurality of positions, and in the illustrated embodiment, in a plurality of non-predefined positions, between the extended position and the retracted position. As used herein and in the appended claims, the phrase "non-predefined positions" means that there are no fixed or predetermined positions into which the members 42 and 66 must fall between the fully extended and fully refracted positions. In other words, the members 42, 66 can be considered to have infinite or unlimited adjustability between the extended and retracted positions. The locking mechanism 150 is movable manually by a user to an unlocked position (see FIG. 6) allowing adjustment of the mount 10 between the extended and refracted positions, and is movably automatically, upon release of the locking mechanism 150 by the user, to a locked position (see FIGS. 1, 2, and 5) in which the outer and inner members 42, 66 are substantially prevented from moving relative to one another. As used herein and in the appended claims, the phrases "substantially locked" and "substantially prevented from moving relative to one another" mean that relative movement between the outer and inner members 42, 66 will not occur during vibration and G-forces typically associated with on-road driving (e.g., root mean square G-force of about 7.7 g), but that some relative movement between the outer and inner members 42, 66 may occur during vibration and G-forces that might be experienced during aggressive, off-road driving (e.g., about 40 g).

With reference to FIGS. 4-6, the illustrated locking mechanism 150 is positioned in alignment with respective corners 50, 68 of the outer and inner members 42, 66, although in other embodiments the locking mechanism 150 need not be aligned with a corner, but could be aligned with respective planar surfaces of the members 42, 66. The locking mechanism 150 includes an extension member 154 coupled (e.g., by welding, brazing, or other suitable securing methods) to one corner 50 of the outer member 42. An opening 158 is provided in the outer member 42 to receive the extension member 154 and other components of the locking mechanism 150, as will be described further below. The illustrated extension member 154 is generally cylindrical and defines a mounting end 162 secured to the outer member 42, an open end 166 spaced from the mounting end 162, and a wall portion 170 between the ends 162, 166. A threaded aperture 174 extends through the wall portion 170.

The locking mechanism 150 further includes an axle 178 at least partially supported by the extension member 154. The axle 178 is rotatable about an axis of rotation 182 (see FIG. 4) that extends transverse to a direction of movement of the outer and inner members 42, 66 between the extended and refracted positions. As will be further described below, rotation of the axle 178 in a first, unlocking direction of rotation (counter-clockwise in FIG. 4) causes translation of the axle along the axis 182 in a direction away from the inner member 66 to move the locking mechanism 150 to the unlocked position, and rotation of the axle 178 in a second, locking direction of rotation (clockwise in FIG. 4) causes translation of the axle 178 along the axis 182 in a direction toward the inner member 66 to move the locking mechanism 150 to the locked position. Rotation and translation of the axle 178 is achieved by receipt and inter-engagement of a threaded portion 186 of the axle 178 in the threaded aperture 174 of the extension member 154.

The axle 178 is additionally supported by a cover member 190 that is coupled to both the axle 178 and the extension member 154. The illustrated cover member 190 has a generally hexagonally-shaped outer surface and a generally cylindrically-shaped inner surface extending between an open end 194 and a closed end 198 of the cover member 190. The open end 194 of the cover member 190 is received over the open end 166 of the extension member 154, and the closed end 198 of the cover member 190 includes an aperture 202 through which the axle 178 is received. As best seen in FIG. 4, the aperture 202 in the cover member 190 is defined in part by projections 206 extending radially inwardly for receipt in grooves or recesses 210 in a splined or ribbed portion 214 of the axle 178. The inter-engagement between the projections 206 and the grooves 210 couples the cover member 190 to the axle 178 for co-rotation, while allowing relative translation in one direction to facilitate assembly. A flange 216 on the axle 178 prevents translation of the cover member 190 toward the outer member 42.

A low-friction bushing 218 can be positioned in the open end 194 of the cover member 190 to reduce rotational friction between the inner surface of the cover member 190 and the outer surface of the extension member 154. The illustrated bushing 218 can be a low-friction plastic material (e.g., Nylon, Teflon, Delrin, etc.) and can include an axially-extending slot 222 and a radially-extending slot 226 to facilitate assembly over the axle 178.

A jam nut 230 and washer 234 secure the cover member 190 in position surrounding a portion of the axle 178, with threads on the nut 230 inter-engaging another threaded portion 238 of the axle 178. A handle 242 is fixed to an end of the axle 178 for rotation therewith such that turning of the handle 242 by a user turns the axle 178 and the cover member 190. As best shown in FIGS. 4 and 6, a set screw 246 is used to secure the handle 242 to the end of the axle 178. Of course, other methods of securing the handle 242 to the axle 178 for co-rotation can be used.

A clamp pad 250 is coupled with the end of the axle 178 to extend with the axle 178 through the opening 158 in the outer member 42 and to be positioned adjacent the corner 68 of the inner member 66. The clamp pad 250 is coupled to the axle 178 such that the axle 178 can rotate relative to the clamp pad 250. Additionally, the clamp pad 250 can translate at least partially with the axle 178, and can perhaps also translate in part relative to the axle 178. More specifically, in the illustrated embodiment, the clamp pad 250 includes a threaded aperture 254 (see FIG. 4) that receives a threaded distal end portion 258 of the axle 178. The threads in the threaded aperture 254 and on the threaded distal end portion 258 are left-hand threads, while the threads in the threaded aperture 174 of the extension member 154 and on the threaded portion 186 of the axle 178 are right-hand threads. Therefore, while counter-clockwise rotation of the axle 178 will cause translation of the axle 178 away from the inner member 66, the counter-clockwise rotation of the axle 178 will at the same time cause the clamp pad 250 to translate relative to the retreating axle 178 and away from the inner member 66 while the axle 178 rotates relative to the clamp pad 250 (see FIG. 5 showing the spacing between the clamp pad 250 and the shoulder of the axle 178, and FIG. 6 showing the lack of spacing between the clamp pad 250 and the shoulder of the axle 178). Likewise, clockwise rotation of the axle 178 will cause translation of the axle 178 toward the inner member 66, and will cause the clamp pad 250 to translate relative to the axle 178 toward the inner member 66.

The clamp pad 250 is prevented from rotating due to the configuration of its surface 262 (see FIG. 4), which conforms generally to the shape of the corner 68 of the inner member 66 against which the clamp pad 250 engages. Other arrangements for securing the clamp pad 250 to the axle 178 to allow rotation of the axle 178 relative to the clamp pad 250 while also permitting at least some translation of the clamp pad 250 with the axle 178 can be used. For example, the clamp pad 250 could be riveted, with some slight axial play allowing rotation, to the end of the axle 178.

The clamp pad 250, or at least the surface 262 of the clamp pad 250 is made of a high-friction, wear-resistant material that will provide a substantially secure friction-lock engagement between the axle 178 and the inner member 66 when the clamp pad 150 is compressed against the corner 68 of the inner member 66 as shown in FIG. 5. This secure friction-lock engagement helps ensure that the relative movement of the outer and inner members 42, 66 is substantially prevented when the locking mechanism 150 is in the locked position. Of course, as discussed above and as understood by those skilled in the art, the use of the friction-engagement provided by the clamp pad 250 may allow some relative movement between the outer and inner members 42, 66 under extreme vibration and G-force circumstances even when the locking mechanism 150 is in its locked position.

The locking mechanism 150 further includes a biasing element in the form of a torsion spring 266 coupled with the axle 178, between the extension member 154 and the cover member 190 to bias the cover member 190, and therefore the axle 178, rotationally in the second, locking direction (clockwise in FIG. 4). In other embodiments, the biasing element 266 can take other forms, and need not be a torsion spring. The spring 266 is partially surrounded by both of the extension member 154 and the cover member 190 so that most of the spring 266 is covered and concealed from view. A first end 270 of the spring 266 is secured to the cover member 190. More specifically, the first end 270 is bent or otherwise deformed to be substantially L-shaped and is received in a substantially L-shaped slot 274 formed in the cover member 190. The L-shaped slot 274 in the cover member 190 has an axially-extending portion to allow assembly of the cover member 190 over the spring 266, and a laterally-extending portion in which the first end 270 of the spring 266 resides after assembly.

A second end 278 of the spring 266 is secured to the extension member 154. More specifically, the second end 278 is bent or otherwise deformed to be substantially U or J-shaped and is received in a substantially L-shaped slot 282 formed in the extension member 154. The L-shaped slot 282 in the extension member 154 has an axially-extending portion to allow assembly of the spring 266 into the extension member 154, and a laterally-extending portion in which the second end 278 of the spring 266 resides after assembly.

The spring 266 is therefore coupled between the non-rotatable extension member 154 and the rotating cover member 190. The spring 266 is preloaded to about fifteen to twenty-five pounds force upon assembly by rotating the first and second ends 270, 278 relative to one another by about 135 to 160 degrees from the spring's relaxed position. This is achieved due to the geometry and relative positioning of the L-shaped slots 274, 282. Therefore, the spring 266 is preloaded to bias the cover member 190 and the axle 178 in the second, locking direction of rotation. A user's rotation of the handle 242 to rotate of the cover member 190 with the axle 178 in the first, unlocking direction overcomes the bias of the spring 266 and results in additional energy (i.e., potential energy) being stored in the spring 266. When the user releases the handle 242, the preload force in the spring 266 and the additional stored energy created by the user's previous rotation of the handle 242 causes the cover member 190, the axle 178, and the handle 242 to automatically rotate, due to the biasing energy stored in the spring 266, in the second, locking direction of rotation. Therefore, the spring 266 biases the locking mechanism 150 to the locked position and eliminates the need for a user to positively or actively manipulate the handle 242 to lock the locking mechanism 150. This makes the locking mechanism 150, and the entire mounting device 10, easier to use and operate than prior art mounting devices that require active input on behalf of the user to both unlock and lock a locking mechanism.

The operation of the mounting device 10 will now be described. Should a user wish to adjust the height of the mounting platform 98, he will grasp and turn the handle 242 from the position shown in FIGS. 1, 2, and 6 in the first, unlocking direction of rotation (counter-clockwise in the illustrated embodiment). Turning of the handle 242 overcomes the bias of the spring 266 such that the axle 178 and cover member 190 also rotate in the first, unlocking direction. As the cover member 190 rotates, the torsion input to the spring 266 results in increased stored energy in the spring 266. Rotation of the axle 178 causes the axle 178 to translate axially away from the inner member 66. The clamp pad 250, which was previously tightly clamped against the corner 68 of the inner member 66, will translate axially away from the inner member 66, both with the axle 178 and with respect to the axle 178 as described above. The surface 262 of the clamp pad 250 will disengage the corner 68 of the inner member 66 to allow the inner member 66 to be moved relative to the outer member 42.

The user can then, while holding the handle 242 in the unlocked position, raise or lower the mounting platform 98 by changing the relative position of the outer and inner members 42, 66 as desired to the extended position, the retracted position, or to any position therebetween. As described above, the compression spring 90 resists the inner member 66 falling abruptly to the retracted position, and can provide a balanced system so that the user will manually raise or lower the mounting platform 98 to the desired position.

When the user has adjusted the mounting platform 98 to the desired height, he releases the handle 242. Without the user's manual force to overcome the bias of the spring 266, the preload and additional stored energy in the spring 266 cause the cover member 190, the axle 178, and the handle 242 to rotate in the second, locking direction. As the axle 178 rotates, it translates axially toward the inner member 66. The clamp pad 250 translates with the axle 178 and also relative to the axle 178 to clampingly engage the corner 68 of the inner member 66, thereby substantially securing and locking the inner member 66 relative to the outer member 42 in the position desired by the user. The relative position of the outer and inner members 42, 66 is not limited to any predetermined positions, but is limitless to provide excellent flexibility. Furthermore, the ability to simply release the handle 242 to automatically achieve the locked position of the locking mechanism 150 at any location to prevent relative movement of the outer and inner members 42, 66 makes use and operation of the mounting device 10 easy and intuitive. This ease of operation can be contrasted to prior devices in which a user had to actively lock and actively unlock knobs, levers, pins, and the like, perhaps after first making sure to obtain alignment of two or more parts in one of only a few predetermined locking positions.

Various features and advantages of the invention are set forth in the following claims.

What is claimed is:

1. A telescoping mount comprising:
an outer member;
an inner member at least partially received in the outer member such that one of the outer member and the inner member is movable relative to the other of the outer member and the inner member between two positions;
a mounting platform coupled to one of the outer and inner members for supporting a device;
a locking mechanism operable to lock the position of the outer and inner members relative to one another in a plurality of non-predefined positions between the two positions, the locking mechanism including an axle rotatable about an axis of rotation that extends transverse to a direction of movement of the inner and outer members between the two positions;
an extension member coupled to the outer member;
a cover member coupled to the axle for rotation therewith as the axle moves either away from or towards the inner member; and
a biasing element coupled at one end to the extension member and at another end to the cover member for rotation therewith, wherein the cover member is rotatable adjustable relative to the axle to adjust a rotational biasing force of the biasing element, and wherein the locking mechanism is movable manually by a user to an unlocked position allowing adjustment of the mount between the two positions, and the locking mechanism is movable automatically as a result of the rotational biasing force of the biasing element, upon release of the locking mechanism by the user from the unlocked position, to a locked position in which the outer and inner members are prevented from moving relative to one another.

2. The telescoping mount of claim 1, further comprising a biasing member coupled between the outer and inner members to resist movement of the outer and inner members toward a first position.

3. The telescoping mount of claim 2, wherein the biasing member is selected so that upon movement of the locking mechanism to the unlocked position, the outer and inner members will not automatically move toward either of the two positions, but will remain static until moved by a user.

4. The telescoping mount of claim 1, wherein rotation of the axle in a first, unlocking direction of rotation causes translation of the axle along the axis in a direction away from the inner member to move the locking mechanism to the unlocked position, and wherein rotation of the axle in a second, locking direction of rotation causes translation of the axle along the axis in a direction toward the inner member to move the locking mechanism to the locked position.

5. The telescoping mount of claim 4, wherein the biasing element is coupled with the axle to bias the axle rotationally in the second, locking direction.

6. The telescoping mount of claim 1, wherein the biasing element is a torsion spring.

7. The telescoping mount of claim 5, wherein the locking mechanism further includes a handle fixed to the axle for rotation therewith such that turning of the handle by the user in the first, unlocking direction of rotation overcomes the bias of the biasing element and stores energy in the biasing element, and such that release of the handle by the user results in the stored energy in the biasing element automatically rotating the axle in the second, locking direction.

8. The telescoping mount of claim 1, wherein the cover member at least partially surrounds the biasing element and the axle.

9. The telescoping mount of claim 4, wherein the outer member includes an opening and wherein the axle extends through the opening in the outer member.

10. The telescoping mount of claim 9, wherein the outer member and the inner member are generally rectangular in cross section and wherein the axle is aligned with a corner of the inner member.

11. The telescoping mount of claim 10, wherein the locking mechanism further includes a clamp pad coupled with an end of the axle, the clamp pad configured to selectively engage the corner of the inner member to achieve the locked position of the locking mechanism.

12. The telescoping mount of claim 11, wherein the clamp pad is coupled to the axle such that the clamp pad can translate along the axis with the axle.

13. A telescoping mount comprising:
an outer member;
an inner member at least partially received in the outer member such that one of the outer member and the inner member is movable relative to the other of the outer member and the inner member between two positions;
a mounting platform coupled to one of the outer and inner members for supporting a device; and
a locking mechanism operable to lock the position of the outer and inner members relative to one another in a plurality of positions between the two positions, the locking mechanism including
an extension member coupled to the outer member;
an axle at least partially supported by the extension member, the axle being rotatable about an axis of rotation that extends transverse to a direction of movement of the inner and outer members between the two positions, wherein rotation of the axle in a first, unlocking direction of rotation causes translation of the axle along the axis in a direction away from the inner member to move the locking mechanism to an unlocked position allowing adjustment of the mount between the two positions, and wherein rotation of the axle in a second, locking direction of rotation causes translation of the axle along the axis in a direction toward the inner member to move the locking mechanism to a locked position in which the outer and inner members are prevented from moving relative to one another;
a cover member coupled to the axle for rotation therewith as the axle moves either away from or towards the inner member, the cover member at least partially surrounding the axle;
a biasing element coupled between the extension member and the cover member to bias the axle rotationally in the second, locking direction, wherein the cover member is rotatably adjustable relative to the axle to adjust a rotational biasing force of the biasing element; and a handle fixed to the axle for rotation therewith such that turning of the handle by the user in the first, unlocking direction of rotation overcomes the bias of the biasing element and stores rotational energy in the biasing element, and such that release of the handle by the user from the unlocked position results in the stored rotational energy in the biasing element automatically rotating the axle in the second, locking direction.

14. The telescoping mount of claim 13, further comprising a biasing member coupled between the outer and inner members to resist movement of the outer and inner members toward a first position.

15. The telescoping mount of claim 14, wherein the biasing member is selected so that upon movement of the locking mechanism to the unlocked position, the outer and inner members will not automatically move toward either of the two positions, but will remain static until moved by a user.

16. The telescoping mount of claim 13, wherein the biasing element is a torsion spring having a first end secured to the cover member and a second end secured to the extension member, the cover member and the extension member substantially surrounding the torsion spring.

17. The telescoping mount of claim 13, wherein the outer member includes an opening and wherein the axle extends through the opening in the outer member.

18. The telescoping mount of claim 13, wherein the outer member and the inner member are generally rectangular in cross section and wherein the axle is aligned with a corner of the inner member.

19. The telescoping mount of claim 18, wherein the locking mechanism further includes a clamp pad coupled with an end of the axle, the clamp pad configured to selectively engage the corner of the inner member to achieve the locked position of the locking mechanism.

20. The telescoping mount of claim 19, wherein the clamp pad is coupled to the axle such that the clamp pad can translate along the axis with the axle.

21. The telescoping mount of claim 13, wherein threads on the axle engage threads on the extension member to cause translation of the axle upon rotation of the axle.

22. A telescoping mount comprising:

an outer member;

an inner member operatively coupled to the outer member, the outer member and the inner member configured to move relative to one another between two positions;

a mounting platform coupled to one of the outer and inner members for supporting a device;

a locking mechanism operable to lock the position of the outer and inner members relative to one another between the two positions, the locking mechanism including an axle rotatable about an axis of rotation that extends transverse to a direction of the relative movement between the inner and outer members;

a first member fixedly coupled to the outer member;

a second member removably coupled to the axle for rotation therewith as the axle moves either away from or towards the inner member; and a biasing element coupled at one end to the first member and at another end to the second member for rotation therewith, wherein the second member is rotatably adjustable relative to the axle to adjust a rotational biasing force of the biasing element such that the locking mechanism is movable automatically as a result of the rotational biasing force of the biasing element from an unlocked position to a locked position in which the outer and inner members are prevented from moving relative to one another.

* * * * *